3,291,818
PROCESS FOR THE MANUFACTURE OF MONOMERIC, ANHYDROUS LEAD SALTS OF ACRYLIC OR METHACRYLIC ACID
Heinz Ratz, Troisdorf, and Paul Spielau, Spich, Germany, assignors to Dynamit Nobel Aktiengesellschaft, Troisdorf, Germany, a corporation of Germany
No Drawing. Filed Dec. 19, 1963, Ser. No. 331,964
Claims priority, application Germany, Jan. 5, 1963, D 40,632
6 Claims. (Cl. 260—435)

The present invention relates to monomeric, anhydrous lead salts of acrylic or methacrylic acid, and more particularly to a process for the manufacture of such monomeric, anhydrous lead salts of acrylic or methacrylic acid.

Lead methacrylates have been manufactured hitherto by the transposition of water-soluble lead salts with alkali methacrylates in aqueous solution. Products manufactured in such manner, however, always contain a few percent of water. When such products are worked with polyvinyl chloride, for example, for the stabilization of the latter at elevated temperatures, the presence of such small quantities of water leads to the formation of undesired free methacrylic acid. The water cannot be dried out of the lead methacrylate thus obtained, even by drying in a vacuum, inasmuch as an objectionable polymerization can very easily take place under the vacuum conditions. The undesired water content cannot be eliminated, or can be eliminated only with difficulty, by recrystallization, because when heat is applied, insoluble and non-fusible polymerized lead methacrylate precipitates out. The same is the case when an attempt is made to manufacture lead salts of acrylic acid by the prior-art procedure rather than lead salts of methacrylic acid.

It is an object of the present invention to overcome the foregoing drawbacks and to provide for the efficient manufacture of monomeric, anhydrous lead salts of acrylic or methacrylic acid.

It is a further object of the invention to provide a process for the manufacture of such monomeric lead salts which is versatile in nature and efficient insofar as manipulative steps and quantity of yield are concerned.

Other and further objects of the invention will become apparent from a study of the within specification and accompanying examples.

It has now been found in accordance with the present invention that it is possible to manufacture monomeric, anhydrous lead salts of acrylic or methacrylic acid, such as α-methacrylic acid, which do not have the above-named disadvantages, by reacting lead oxide (PbO) or lead carbonate with the corresponding free acids in a mixture of solvents which is composed of water-insoluble and water-soluble water-binding components, and dissolving such free acids in the solvent mixture but not the lead salts that are formed. It is expedient to operate at temperatures from 0° C. to approximately 15° C. The products obtained are desirable stabilizers for polyvinylchloride.

The water-soluble portion of the solvent mixture amounts to about 5 to about 20 percent, and especially about 8 to 12%, by volume, with the remainder being the water-insoluble portion of such mixture of solvents. The solvents, of course, are to be miscible with one another in the proportions used.

Among the water-insoluble solvents which may be used in accordance with the invention are low-boiling aromatic and cycloaliphatic hydrocarbons, such as benzene, toluene, xylene, cyclohexane or the like. In like manner, among the water-soluble and water-binding solvents which may be used are, for example, low-boiling aliphatic cyclic ethers and aliphatic ketones, such as tetrahydrofuran, acetone, dioxan, methyl ethyl ketone or the like. Of course, it is expedient to dry all solvents before hand, insofar as possible, for obvious reasons.

The molar ratios of lead oxide or lead carbonate to the acids used can be chosen between 1:1 and 1:2, according to the desired lead content.

Accordingly, it will be appreciated that the present process for the manufacture of monomeric anhydrous lead salts of acrylic and methacrylic acid contemplates reacting the corresponding free acid with a member of the group consisting of lead oxide and lead carbonate in a solvent mixture composed of water-insoluble, and water-soluble, water-binding components, whereby the content of unreacted free acid present remains dissolved in the solvent mixture while the corresponding lead salts formed in the reaction remain undissolved. Such solvent mixture thus includes a water-insoluble component selected from the group consisting of benzene, toluene, xylene, and cyclohexane, as well as a water-soluble component selected from the group consisting of tetrahydrofuran, acetone, dioxan, and methyl ethyl ketone. While the temperature is preferably below 15° C., the reaction may be carried out conveniently at temperatures between about 5–15° C. The reaction may be carried out with agitation to assure completion of the reaction, and the solvent components are preferably predried before use to avoid the undesirable presence of excess water. Since the portion of unreacted free acid is soluble in the solvent mixture, whereas the lead salt formed in the reaction is insoluble therein, ready separation of the lead salt is obtained merely by filtration.

*Example 1*

2700 ml. of benzene, 300 ml. tetrahydrofuran and 680 g. of powdered lead oxide are placed in a 5-liter three-necked flask with agitator and cooling means. Both solvents are distilled and dried beforehand. The suspension is chilled to 5° C., and, with good agitation, 540 g. of anhydrous methacrylic acid are added dropwise in such a manner that the internal temperature does not exceed 15° C. After the addition of all the methacrylic acid and the disappearance of the yellow lead oxide, the agitation is continued for a little longer, then the mixture is suction filtered and vacuum-dried. The yield amounts to 1110 g. (96.8%) of neutral lead methacrylate with a lead content of 54.7% and a melting point of 75° C.

*Example 2*

The procedure of Example 1 is repeated. The quantities used are the following:

Benzene, anhydrous, ml. _____ 2700
Tetrahydrofuran, anhydrous, ml. _____ 300
Lead oxide, g. _____ 800
Methacrylic acid, anhydrous, g. _____ 310

The yield of basic lead methacrylate amounts to 900 g.=81%. It has no melting point.

*Example 3*

The procedure of Example 1 is repeated.
The quantities used are the following:

Benzene, anhydrous, ml. _____ 170
Tetrahydrofuran, anhydrous, ml. _____ 20
Lead oxide, g. _____ 45
Acrylic acid, anhydrous, g. _____ 30

71 g. of polymerizable lead acrylate are obtained with a melting point of 99–100° C.

Example 4

The procedure of Example 1 is repeated.
The quantities used are the following:

| | |
|---|---:|
| Benzene, anhydrous, ml. | 170 |
| Acetone, anhydrous, ml. | 20 |
| Methacrylic acid, anhydrous, g. | 43 |
| $PbCO_3$, g. | 54 |

74 g.=78.6% lead methacrylate are obtained with a melting point of 75° C.

What is claimed is:

1. Process for the manufacture of monomeric anhydrous lead salts of acrylic and methacrylic acid, which comprises reacting the corresponding free acid with a member selected from the group consisting of lead oxide, lead carbonate, and mixtures thereof, in a solvent mixture composed of about 95–80% by volume of a water-insoluble component consisting essentially of at least one of low boiling aromatic and cyclo-aliphatic hydrocarbons and about 5–20% by volume of a water-soluble, water-binding component consisting essentially of at least one of low boiling aliphatic cyclic ethers and aliphatic ketones, whereby the content of unreacted free acid present remains dissolved in said solvent mixture while the corresponding lead salts formed in the reaction remain undissolved.

2. Process according to claim 1 wherein the reaction is carried out at temperatures below about 15° C.

3. Process for the manufacture of monomeric lead salts of acrylic and methacrylic acid, which comprises reacting a member selected from the group consisting of lead oxide, lead carbonate, and mixtures thereof, with a member selected from the group consisting of acrylic and methacrylic acids, and mixtures thereof, in a molar ratio of acid to lead compound of between about 1–2:1, in a solvent mixture composed of a water-insoluble component selected from the group consisting of benzene, toluene, xylene, cyclohexane, and mixtures thereof, and a water-soluble component selected from the group consisting of tetrahydrofuran, acetone, dioxan, methyl ethyl ketone, and mixtures thereof, at a temperature up to about 15° C., the water-soluble portion of said solvent mixture amounting to about 8–12% by volume, with the remainder of such solvent mixture being the water-insoluble portion, whereby the content of unreacted free acid present remains dissolved in said solvent mixture while the corresponding lead salt formed in the reaction remains undissolved.

4. Process according to claim 3 wherein the solvent components are predried before use in the reaction and the corresponding monomeric, anhydrous lead salt is recovered from the reaction mixture by filtration.

5. Process according to claim 4 wherein the reaction is carried out at a temperature of between about 0–15° C. with agitation.

6. Process for the manufacture of monomeric anhydrous lead salts of acrylic and methacrylic acid, which comprises reacting the corresponding free acid with a member selected from the group consisting of lead oxide, lead carbonate, and mixtures thereof, in a solvent mixture composed of about 95–80% by volume of a water-insoluble component selected from the group consisting of benzene, toluene, xylene, cyclohexane, and mixtures thereof, and about 5–20% by volume of a water-soluble, water-binding component selected from the group consisting of tetrahydrofuran, acetone, dioxan, methyl ethyl ketone, and mixtures thereof, whereby the content of unreacted free acid present remains dissolved in said solvent mixture while the corresponding lead salts formed in the reaction remain undissolved.

No references cited.

TOBIAS E. LEVOW, *Primary Examiner.*

E. C. BARTLETT, H. M. S. SNEED,
*Assistant Examiners.*